United States Patent
Kimm

[19]
[11] Patent Number: 5,915,331
[45] Date of Patent: Jun. 29, 1999

[54] PROCESS FOR LOCATING AN OBJECT

[75] Inventor: Kurt Kimm, Reessum-Taaken, Germany

[73] Assignee: Westfalia Landtechnik GmbH, Oelde, Germany

[21] Appl. No.: 08/913,830

[22] PCT Filed: Jun. 27, 1996

[86] PCT No.: PCT/EP96/02808

§ 371 Date: Sep. 16, 1997

§ 102(e) Date: Sep. 16, 1997

[87] PCT Pub. No.: WO97/01954

PCT Pub. Date: Jan. 23, 1997

[30] Foreign Application Priority Data

Jul. 3, 1995 [DE] Germany .......................... 195 23 676

[51] Int. Cl.[6] ................................................. A01J 5/007
[52] U.S. Cl. ................................... 119/14.08; 119/14.02
[58] Field of Search ........................... 119/14.02, 14.08, 119/14.1

[56] References Cited

U.S. PATENT DOCUMENTS 5,379,721  1/1995  Dessing et al. ...................... 119/14.08
5,479,876  1/1996  Street et al. .......................... 119/14.08

FOREIGN PATENT DOCUMENTS 213 660      3/1987   European Pat. Off. .
455 305 A1  11/1991   European Pat. Off. .
553940       8/1993   European Pat. Off. ............ 119/14.08
576 086 A2  12/1993   European Pat. Off. .
39 38 077 A1 5/1991   Germany .

OTHER PUBLICATIONS

Artmann, Rudolf and Dieter Schillingmann, "Entwichlungsstand von Melkrobotern", *Landtechnik*, No. 12, pp. 437–440; 9 translution attatched.

*Primary Examiner*—Robert P. Swiatek
*Attorney, Agent, or Firm*—Merchant, Gould, Smith, Edell, Welter & Schmidt

[57] ABSTRACT

A process for locating an object, in particular a teat of a cow within an operation range using a sensor matrix (10) of a milking robot. This process is characterized in that the location identified using the sensor matrix (10) is checked for plausibility during the locating process and in the event of an implausible location, a separate diagnostic step is carried out.

4 Claims, 1 Drawing Sheet

PROCESS FOR LOCATING AN OBJECT

FIELD OF THE INVENTION

The invention concerns a process for locating an object, in particular a teat of a cow, within an operational range by means of a sensor matrix of a milking robot.

BACKGROUND OF THE INVENTION

In connection with manipulating apparatus and robots, the sensor problem presents itself again and again, since sensors are the necessary prerequisite for locating, recognizing, or grasping objects by means of a robot or a manipulating arm. Normally a large multitude of different sensors is employed; thus, for example, ultrasonic sensors, electronic cameras, laser or radar sensors find application. Likewise, light barriers are used for locating objects and are especially effective when several light barriers work together in a light-barrier matrix. However, other sensors can also be combined in a matrix.

The position of an object within a light-barrier matrix can be determined relatively easily by checking which of the individual light barriers, or rather, light beams are interrupted by the object. Here, however, faulty readings can result when one or several of the light barriers are interrupted not by the object to be located, but rather by, for example, dirt. In a light barrier the dirt can cling, for example, to the light receptor or the light source. In both cases the light barrier is constantly interrupted.

The operational range of the sensor matrix of a milking robot is usually in the narrow sense the area surrounding the teats of a cow and in the broad sense a milking box in which a cow is to be milked. The sensor matrix is located in most cases on the end of a robot or manipulator arm in the vicinity of a holding device for teat cups. Thus, as a rule the sensor matrix is moved along with the robot or manipulator arm.

The problem forming the basis of the invention is to specify a process by which faulty readings due to a completely or partially soiled sensor matrix are avoided.

SUMMARY OF THE INVENTION

According to the invention, the solution to this problem consists in a process, of the type mentioned at the beginning, in which the location result gained with the help of the sensor matrix is checked for plausibility and, in the event of an implausible location result, a separate diagnostic step is carried out. For this testing of the plausibility several variants are imaginable: for example, when it is a matter of locating a closed object, such as is represented by, for example, the teat of a cow, only neighboring sensors of a sensor matrix may be simultaneously darkened, or rather interrupted, or activated. Every other reading can be explained only by a hole in the object to be located, but this object precisely does not have a hole: thus, a reading other than one in which only neighboring sensors are activated or neighboring light barriers are interrupted is not plausible. Often, sensor matrices are located on the end of a robot or manipulator arm. In such a case the sensor matrix can be moved back and forth during the locating, with the consequence that the object is regularly located outside the sensor matrix. During this, individual sensors may not be activated with regularity or the beam course of the light barriers may not be interrupted. If this is the case, however, then here too it is a matter of an implausible result. If such plausibility tests are carried out regularly during the location process also, then faulty readings attributable to, for example, a partially soiled light-barrier matrix can be detected and excluded from the further evaluation.

After a non-plausible reading has appeared, according to the invention a separate diagnostic step is carried out. This can consist, for example, in a simple self-test of a sensor unit, whose component part is the sensor matrix, and/or of a control computer for the sensor unit. If the sensor matrix is located on a movable robot or manipulator arm, then during the diagnostic step it can also be moved in a purposeful manner, in order, for example, to remove individual sensors or the collective sensor matrix so far from the object to be located that individual sensors or all of the sensors can no longer be activated by the object. Thus, during the separate diagnostic step it can be determined, for example, whether the non-plausible reading is probably due to soiled sensors and which of the sensors are soiled.

The separate diagnostic step is advantageously carried out at a location away from the operational range. The only plausible reading during such a diagnostic step in free space in the case of a light-barrier matrix is that in which an interruption is detected in none of the light-barriers of the matrix. If such an interruption is nevertheless detected, then this is a clear indication of a soiled light-barrier matrix, as can easily happen precisely in the vicinity of animals. Since the separate diagnostic step is carried out at the location of, for example, the teats of a cow away from the operational range, thus, for example, outside a milking box, any effect of the cow on the sensor matrix, for example covering, (further) soiling, or damaging the matrix, can be effectively avoided.

In a subsequent continuation of the process, after the determination of a non-plausible reading a sensor-cleaning step is triggered. The sensor-cleaning step can consist in moving the sensor matrix to a cleaning medium such as, for example, a brush or a sponge and rubbing it against the cleaning medium long enough that the sensor matrix can be assumed to be free of the interfering dirt. A further variant consists in this, that the cleaning medium is attached to a manipulator arm carrying the sensor unit, for example in the region of the sensor matrix, so that for the cleaning of the sensor matrix the sensor unit need only be activated.

An implementation form of a light-barrier matrix will be described in the following with the aid of the drawings.

DETAILED DESCRIPTION OF PREFERRED EMBODIMENTS

The light-barrier matrix 10 comprises in essence several light barriers on a carrier that shows two lateral legs 12 and 14 with ends 16 and 18 elbowed inward, as well as a middle leg 20 connected to the lateral legs 12 and 14. Each light barrier is formed of a light source and a light sensor assigned to the light source.

Figure 1:
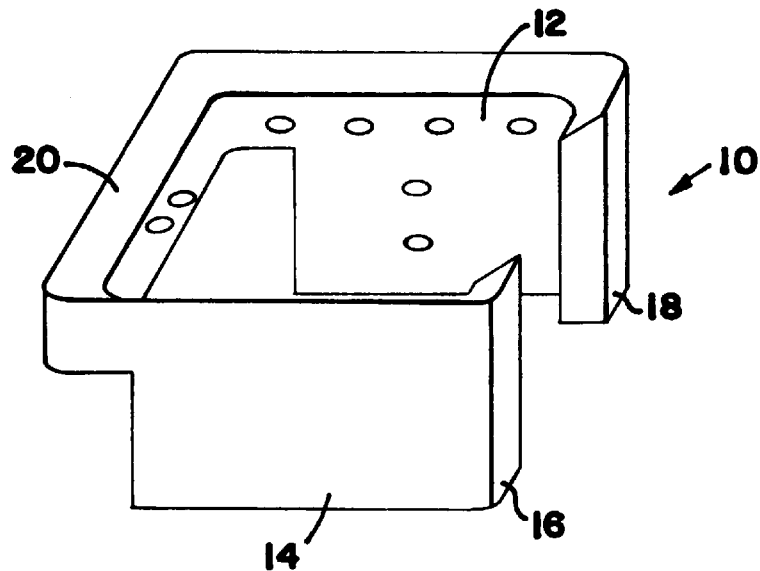
FIG. 1: A perspective representation of a light-barrier matrix for locating a teat of a cow.

The lateral legs 12 and 14 carry in each case a row of four light sources or sensors in the vicinity of their upper edge in FIG. 1, which sources or sensors are so arranged that they face each other in pairs and form four light barriers. Underneath the two rows of four light sources and sensors, respectively, is located on each of the lateral legs 12 and 14 a pair of light sources or sensors, respectively, which are arranged in a row perpendicular with respect to the upper edge of the lateral legs 12 and 14 and form two additional light barriers with light sources and sensors, respectively, facing each other in pairs. The six pairs of light sources and sensors on the two lateral legs 12 and 14 together form a matrix of six light barriers with light beams parallel to each another. The parallel light beams 22 are represented in FIG. 2 as lines.

Figure 2:
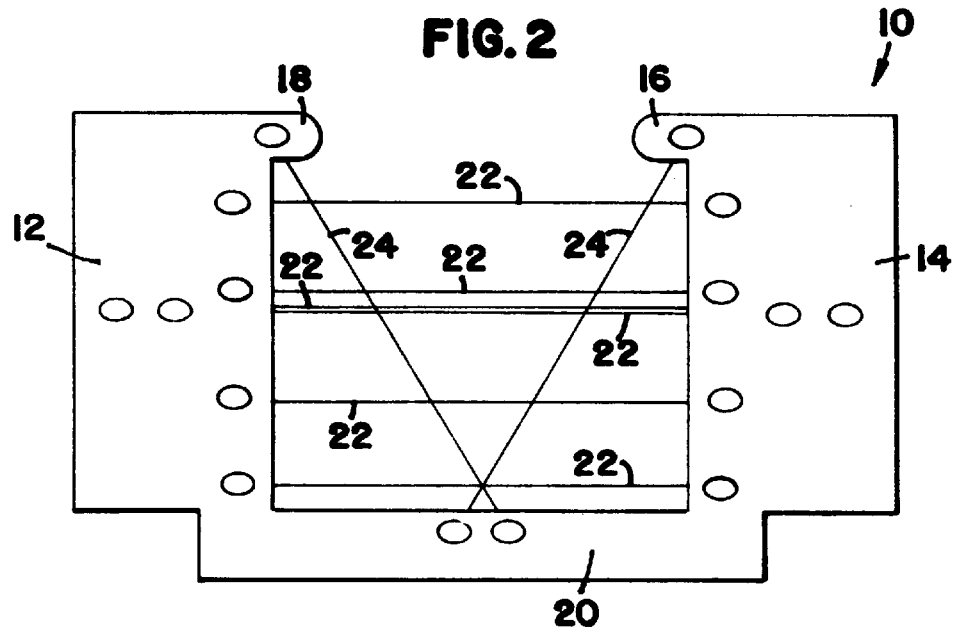
FIG. 2: A schematic representation of the light-barrier matrix from FIG. 1 with swung-out side surfaces.

In addition, the elbowed ends 16 and 18 of the legs 12 and 14 show on their upper ends, with reference to FIG. 2, in each case a light source or sensor, respectively. Assigned to these, in all, two light sources or sensors are two light sources and sensors mounted at the same height in the vicinity of the center of the connecting leg 20 in such a manner that two light barriers with diagonal light beams that cross each other are produced. The diagonal light beams 24 are also drawn in FIG. 2.

The carrier of the light-barrier matrix is arranged at the end of milking robot arm, not shown, above a grab for a teat cup. When by means of the milking robot a teat cup is to be put onto the teat of a cow, the light-barrier matrix helps to locate this teat with such precision that the teat cup can be put onto the teat. To that end, the grab of the robot arm, along with the teat cup, is brought close enough up to a teat that the teat is located within the zone enclosed by the two lateral legs 12 with their elbowed ends 16 and 18 and the connecting leg 20. As soon as this is the case, the grab can be fine positioned, by means of the eight light barriers, with such exactness that the teat cup can be put on. In order that faulty positionings do not come about by reason of soiled light sources or sensors, the location reading is regularly subjected to a plausibility test during the locating and, if necessary, a light-barrier cleaning step is carried out.

I claim:

1. Process for locating an object within an operational range using a sensor matrix of a milking robot, the process comprising:

obtaining a location result using the sensor matrix;

checking the location result for plausibility during location; and if the location result is non-plausible, carrying out a separate diagnostic step.

2. Process according to claim 1, further comprising triggering a sensor-cleaning step if the location result is non-plausible.

3. Process according to claim 1, further comprising carrying out the diagnostic step at a location away from the operational range.

4. Process according to claim 3, further comprising triggering a sensor-cleaning step if the location result is non-plausible.

* * * * *